(12) United States Patent
Igari

(10) Patent No.: US 12,539,855 B2
(45) Date of Patent: Feb. 3, 2026

(54) CONTROLLER AND CONTROL METHOD

(71) Applicant: Robert Bosch GmbH, Stuttgart (DE)

(72) Inventor: Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 18/263,193

(22) PCT Filed: Jan. 19, 2022

(86) PCT No.: PCT/IB2022/050417
§ 371 (c)(1),
(2) Date: Jul. 27, 2023

(87) PCT Pub. No.: WO2022/172104
PCT Pub. Date: Aug. 18, 2022

(65) Prior Publication Data
US 2024/0075926 A1    Mar. 7, 2024

(30) Foreign Application Priority Data

Feb. 10, 2021    (JP) ................................. 2021-019413

(51) Int. Cl.
*B60W 30/14*    (2006.01)
*B60W 30/16*    (2020.01)
(Continued)

(52) U.S. Cl.
CPC .......... *B60W 30/143* (2013.01); *B60W 30/16* (2013.01); *B60W 30/18145* (2013.01);
(Continued)

(58) Field of Classification Search
None
See application file for complete search history.

(56) References Cited

U.S. PATENT DOCUMENTS

2012/0150386 A1    6/2012    Armbrust
2014/0107867 A1*   4/2014    Yamashiro ............ B60W 10/18
                                                      701/2
(Continued)

FOREIGN PATENT DOCUMENTS

DE    102019205881 A1    10/2020
JP    2007058326 A   *   3/2007
JP    2009116882 A       5/2009

OTHER PUBLICATIONS

JP2007058326 (Year: 2007).*
International Search Report and Written Opinion for Application No. PCT/IB2022/050417 dated May 3, 2022 (11 pages).

*Primary Examiner* — Mohamad O El Sayah
(74) *Attorney, Agent, or Firm* — Michael Best & Friedrich LLP

(57) ABSTRACT

The present disclosure provides a controller and a control method that execute an adaptive cruise control appropriately in a group riding.
According to the present disclosure, an execution section (22) of a controller (20) executes an adaptive cruise control based on a surrounding environment information that is information about a surrounding environment of the motorcycle (1). The execution section (22), in the adaptive cruise control, controls a speed of the motorcycle (1) automatically regardless of an accelerating/decelerating operation by a rider of the motorcycle (1) and executes a distance maintenance control to keep a distance between the motorcycle (1) and a target vehicle at a target distance. An identification section (23) of the controller (20) identifies a first convoy including the motorcycle (1) in a group riding in which the motorcycle (1) travels in a group of a plurality of motorcycles (2) forming at least the first convoy and a second convoy separated from each other. The execution section (22) executes the adaptive cruise control based on a first (Continued)

travel state information about a travel state of a second motorcycle, the second motorcycle is one of the plurality of motorcycles (2) and is in the second convoy.

10 Claims, 6 Drawing Sheets

(51) Int. Cl.
 *B60W 30/18* (2012.01)
 *B60W 50/08* (2020.01)
(52) U.S. Cl.
 CPC ....... *B60W 50/087* (2013.01); *B60W 2300/36* (2013.01); *B60W 2554/80* (2020.02)

(56) References Cited

U.S. PATENT DOCUMENTS

| | | |
|---|---|---|
| 2015/0025706 A1 | 1/2015 | Roth |
| 2016/0214609 A1 | 7/2016 | Yamaoka |
| 2017/0144665 A1 | 5/2017 | Ohashi et al. |
| 2019/0248367 A1* | 8/2019 | Knitt .................. B60W 10/184 |
| 2020/0371534 A1* | 11/2020 | Ji ......................... G05D 1/628 |
| 2021/0335134 A1* | 10/2021 | Park ...................... B60W 30/16 |
| 2022/0161788 A1* | 5/2022 | Tamashima ........... B60W 30/12 |
| 2023/0069005 A1* | 3/2023 | Oyanagi ............. B60W 30/165 |
| 2023/0073287 A1* | 3/2023 | Iba ..................... B60W 30/188 |

* cited by examiner

[FIG. 1]
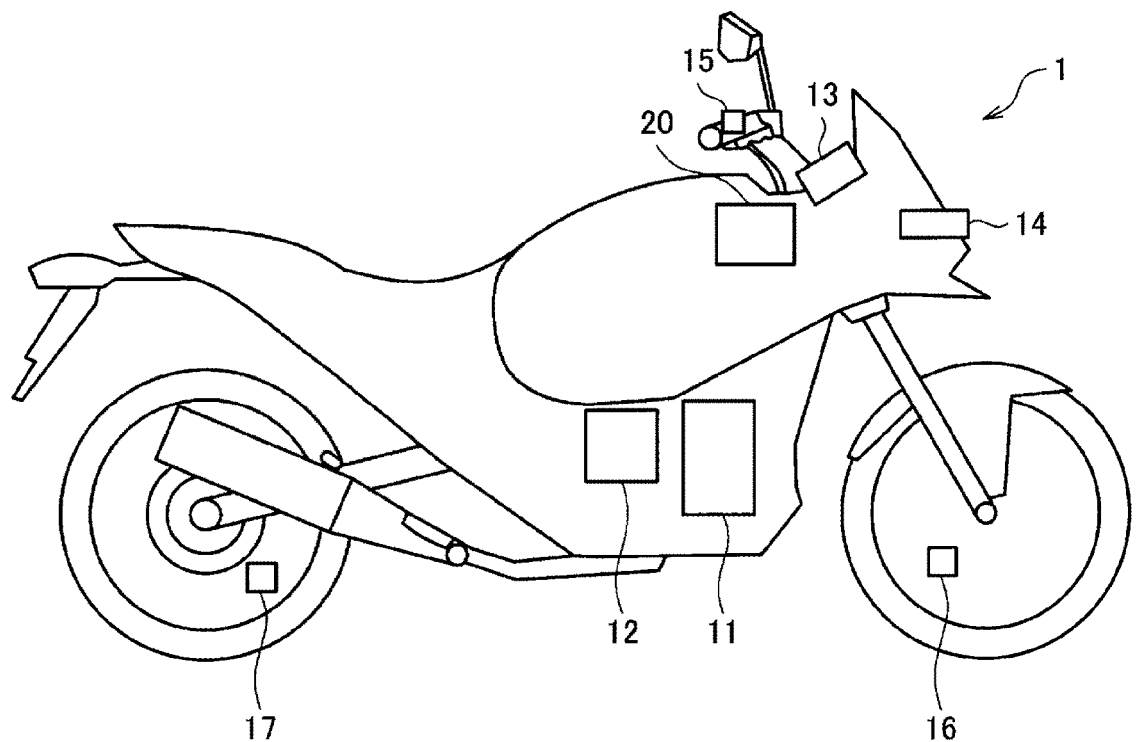
[FIG. 2]
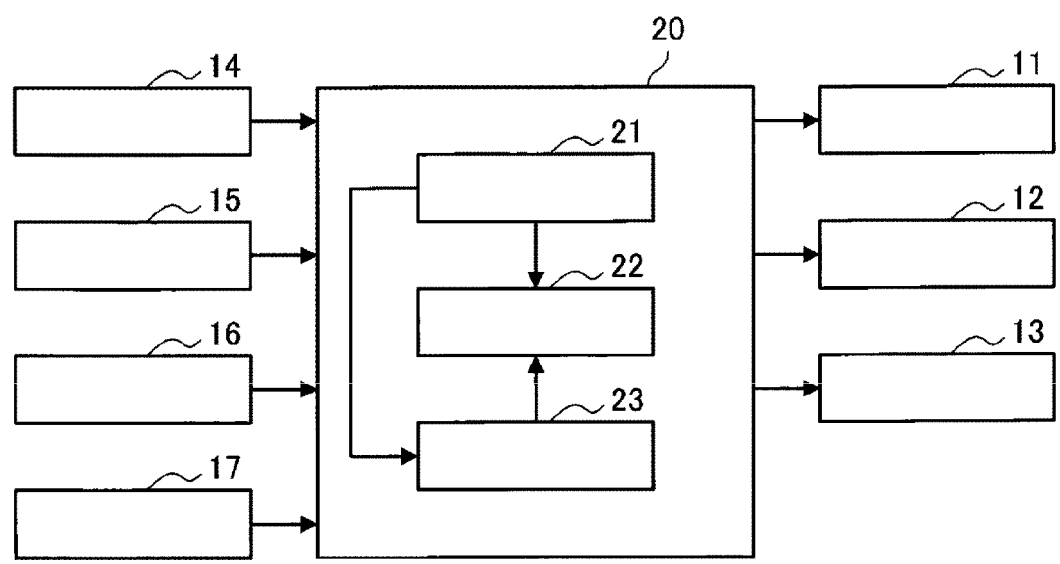

[FIG. 3]
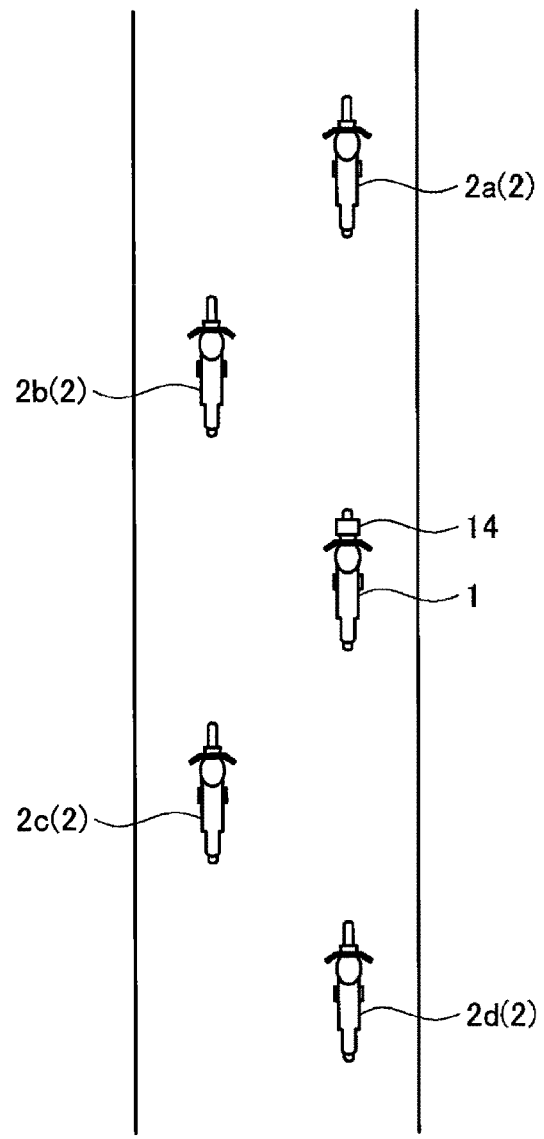

[FIG. 4]
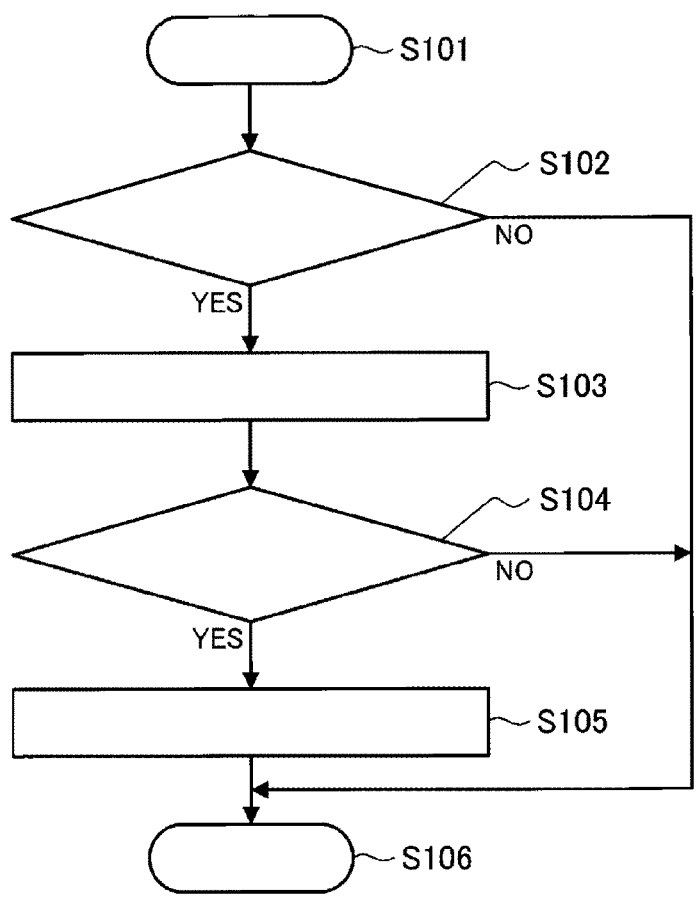

[FIG. 5]
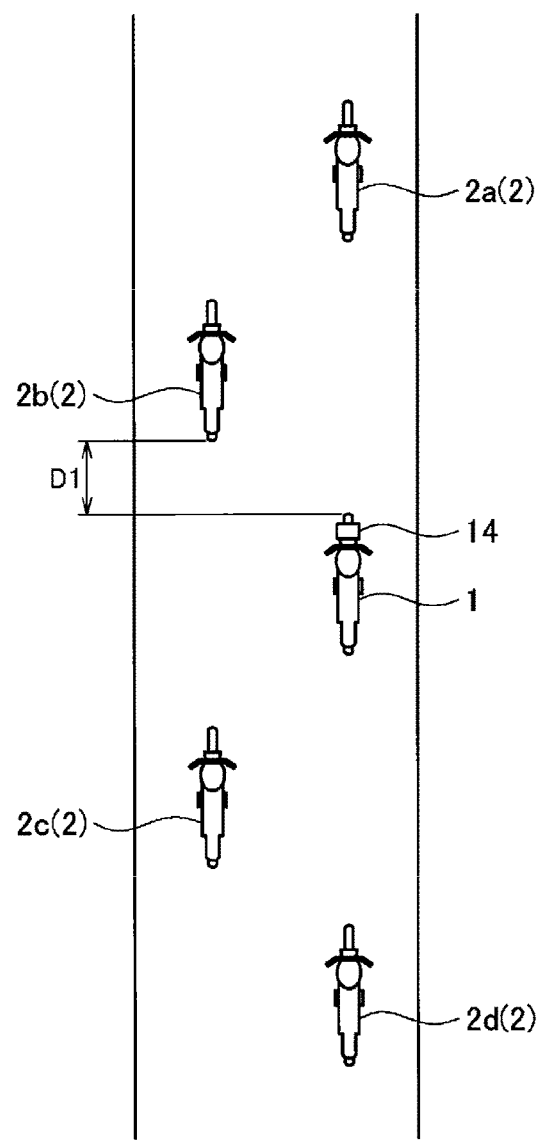

[FIG. 6]
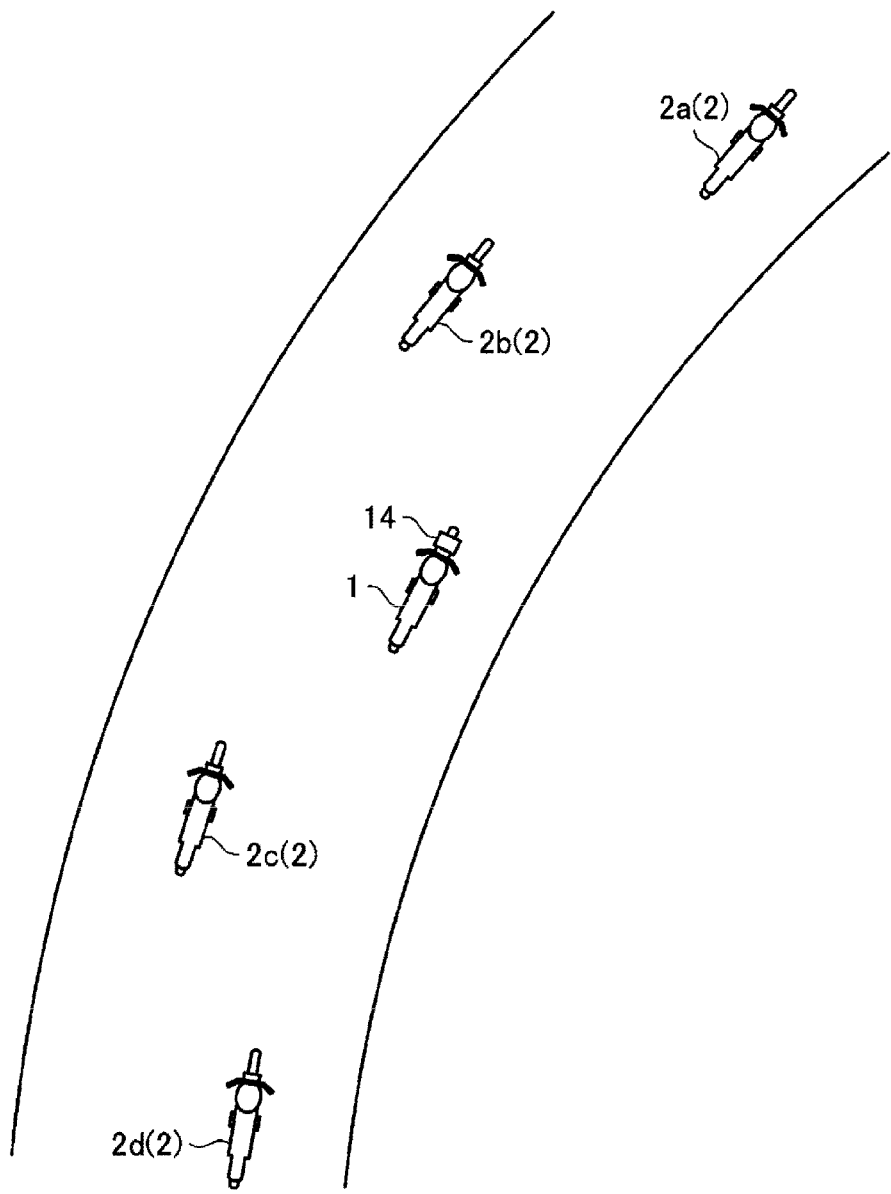

[FIG. 7]
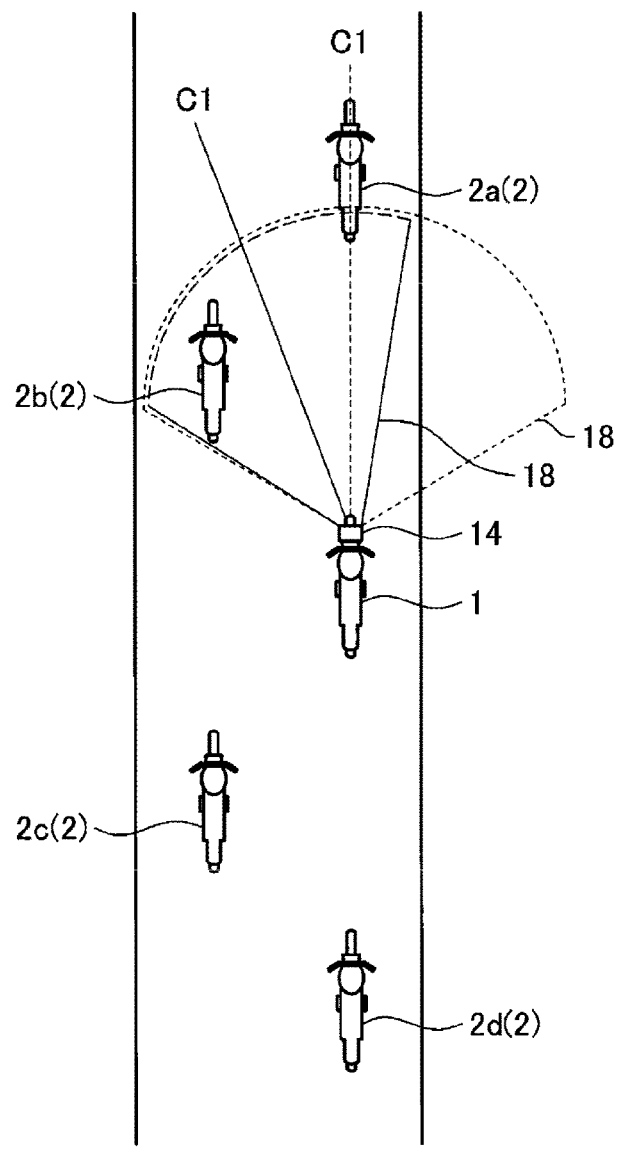

CONTROLLER AND CONTROL METHOD

BACKGROUND

The present disclosure relates to a controller and a control method capable of appropriately executing adaptive cruise control for a motorcycle in group riding.

Various techniques for assisting a rider of a motorcycle in driving a motorcycle are known. For example, JP 2009-116882 A discloses a driver assistance system. The driver assistance system includes a sensor that detects an object located in front of the motorcycle in a travel direction or substantially in the travel direction. In response to a detection result from the sensor, the driver assistance system warns the rider of the motorcycle when the motorcycle inappropriately approaches the object.

An adaptive cruise control is a technique for assisting a driver in driving a vehicle. In the adaptive cruise control, a speed of the vehicle is controlled automatically regardless of an accelerating/decelerating operation by the driver, and a distance maintenance control is operated to keep a distance between an ego vehicle and a target vehicle at a target distance. Such an adaptive cruise control may be employed to a motorcycle. It is important to appropriately execute the adaptive cruise control according to a traffic condition around the ego vehicle. Here, a plurality of motorcycles may travel in a group forming a plurality of convoys. Such a travel state is called a group riding. A traffic condition around the ego vehicle in the group riding may be different from a traffic condition around the ego vehicle not in the group riding. As such, it is required to adjust the adaptive cruise control to be executed appropriately in the group riding.

SUMMARY

The present disclosure addresses the above-described issues. Therefore, it is an objective of the present disclosure to provide a controller and a control method for a motorcycle to execute an adaptive cruise control appropriately in a group riding.

As one aspect of the present disclosure, a controller maneuvers a motorcycle. The controller includes an execution section and an identification section. The execution section executes an adaptive cruise control based on a surrounding environment information that is information about a surrounding environment of the motorcycle. The execution section, in the adaptive cruise control, controls a speed of the motorcycle automatically regardless of an accelerating/decelerating operation by a rider of the motorcycle and executes a distance maintenance control to keep a distance between the motorcycle and a target vehicle at a target distance. The identification section identifies a first convoy including the motorcycle in a group riding in which the motorcycle travels in a group of a plurality of motorcycles forming at least the first convoy and a second convoy separated from each other. The execution section is configured to execute the adaptive cruise control based on a first travel state information about a travel state of a second motorcycle. The second motorcycle is one of the plurality of motorcycles and is in the second convoy.

As one aspect of the present disclosure, a control method for maneuvering a motorcycle includes: executing, by an execution section of a controller, an adaptive cruise control based on a surrounding environment information that is information about a surrounding environment of the motorcycle; and identifying, by an identification section of the controller, a first convoy including the motorcycle in a group riding in which the motorcycle travels in a group of a plurality of motorcycles forming at least the first convoy and a second convoy separated from each other. The execution section executes the adaptive cruise control based on a travel state information about a travel state of a second motorcycle, wherein the second motorcycle is one of the plurality of motorcycles and is in the second convoy. In the adaptive cruise control, the execution section controls a speed of the motorcycle automatically regardless of an accelerating/decelerating operation by a rider of the motorcycle and executes a distance maintenance control to keep a distance between the motorcycle and a target vehicle at a target distance.

According to the controller and the control method, the execution section executes an adaptive cruise control based on a surrounding environment information that is information about a surrounding environment of the motorcycle. The execution section, in the adaptive cruise control, controls a speed of the motorcycle automatically regardless of an accelerating/decelerating operation by a rider of the motorcycle and executes a distance maintenance control to keep a distance between the motorcycle and a target vehicle at a target distance. The identification section identifies a first convoy including the motorcycle in a group riding in which the motorcycle travels in a group of a plurality of motorcycles forming at least the first convoy and a second convoy separated from each other. The execution section is configured to execute the adaptive cruise control based on a first travel state information about a travel state of a second motorcycle. The second motorcycle is one of the plurality of motorcycles and is in the second convoy. Therefore, when the motorcycles are traveling in a group riding, the execution section executes the adaptive cruise control in response to the traffic state around the motorcycle. Thus, the adaptive cruise control can be operated appropriately in the group riding.

BRIEF DESCRIPTION OF DRAWINGS

FIG. 1 is a schematic view illustrating an outline configuration of a motorcycle according to an embodiment of the present disclosure.

FIG. 2 is a block diagram illustrating an exemplary functional configuration of a controller according to the embodiment of the present disclosure.

FIG. 3 is a view illustrating a situation where a group including the motorcycle according to the embodiment of the present disclosure makes group riding.

FIG. 4 is a flowchart illustrating an example of a processing procedure that is related to the group riding and is executed by the controller according to the embodiment of the present disclosure.

FIG. 5 is a view illustrating a situation where the group including the motorcycle according to the embodiment of the present disclosure travels straight.

FIG. 6 is a view illustrating a situation where the group including the motorcycle according to the embodiment of the present disclosure travels a curve.

FIG. 7 is a view illustrating a situation where a detection area in which surrounding environment information used for adaptive cruise control executed by the motorcycle is obtained is changed according to the embodiment of the present disclosure.

DETAILED DESCRIPTION

A description will hereinafter be made on a controller according to the present disclosure with reference to the drawings.

A description will hereinafter be made on a controller that is used for a two-wheeled motorcycle (see a motorcycle 1 in FIG. 1). However, the controller according to the present disclosure may be used for a motorcycle other than the two-wheeled motorcycle (for example, a three-wheeled motorcycle or the like). The motorcycles include a vehicle that has an engine as a propelling source, a vehicle that has an electric motor as the propelling source, and the like. Examples of the motorcycles are a bike, a scooter, and an electric scooter.

In addition, a description will hereinafter be made on a case where the engine (more specifically, an engine 11 in FIG. 1, which will be described below) is mounted as a drive source that can output power for driving a wheel. However, as the drive source, a drive source other than the engine (for example, an electric motor) may be mounted, or plural drive sources may be mounted.

A configuration, operation, and the like, which will be described below, merely constitute one example. The controller and the control method according to the present disclosure are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Motorcycle>

A description will be made on a configuration of the motorcycle 1 according to an embodiment of the present disclosure with reference to FIG. 1 to FIG. 3.

FIG. 1 is a schematic view illustrating an outline configuration of the motorcycle 1. As illustrated in FIG. 1, the motorcycle 1 includes the engine 11, a hydraulic pressure control unit 12, a display device 13, a surrounding environment sensor 14, an input device 15, a front-wheel rotational frequency sensor 16, a rear-wheel rotational frequency sensor 17, and a controller (ECU) 20. In the present specification, the motorcycle 1 will also be referred to as an ego vehicle 1.

The engine 11 corresponds to an example of the drive source of the motorcycle 1 and can output the power for driving the wheel. For example, the engine 11 is provided with: one or plural cylinders, each of which is formed with a combustion chamber therein; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided to an intake pipe of the engine 11, and an intake air amount for the combustion chamber varies according to a throttle opening amount as an opening degree of the throttle valve.

The hydraulic pressure control unit 12 is a unit that has a function of controlling a braking force to be generated on the wheel. For example, the hydraulic pressure control unit 12 includes components (for example, a control valve and a pump). The components are provided to an oil channel that connects a master cylinder and a wheel cylinder, and control a brake hydraulic pressure of the wheel cylinder. The braking force to be generated on the wheel is controlled when operation of each of the components in the hydraulic pressure control unit 12 is controlled. The hydraulic pressure control unit 12 may control the braking force generated on each of a front wheel and a rear wheel or may only control the braking force generated on one of the front wheel and the rear wheel.

The display device 13 has a display function of visually displaying information. Examples of the display device 13 are a liquid-crystal display and a lamp.

The surrounding environment sensor 14 detects surrounding environment information related to surrounding environment of the motorcycle 1. More specifically, the surrounding environment sensor 14 is provided to a front portion of a trunk of the motorcycle 1, and detects the surrounding environment information in front of the ego vehicle 1.

The surrounding environment sensor 14 acquires, as the surrounding environment information, information on a relationship between a position of the motorcycle 1 and a position of a target that exists around the motorcycle 1 (for example, a relative distance, direction, speed, acceleration, jerk, or the like of the motorcycle 1 to the target). Alternatively, the surrounding environment information may be state information of the target that exists around the motorcycle 1, for example. The above targets include, in addition to a vehicle, various obstacles (for example, a road facility, a fallen object, a person, an animal, and the like) other than the vehicle.

As the surrounding environment sensor 14, for example, a camera that captures an image around the motorcycle 1 and a radar that can detect the distance from the motorcycle 1 to the target can be used. For example, the surrounding environment sensor 14 can detect the relative distance, direction, speed, acceleration, jerk, or the like of the motorcycle 1 to the target when detecting the target by using the image captured by the camera and using a detection result by the radar. The configuration of the surrounding environment sensor 14 is not limited to that in the above example. For example, in the surrounding environment sensor 14, the radar may be replaced with a Laser Imaging Detection and Ranging (LIDAR) sensor or an ultrasonic sensor. In addition, the surrounding environment sensor 14 may be a stereo camera, for example.

The input device 15 accepts various operations by the rider. For example, the input device 15 is provided to a handlebar and includes a push button and the like used for the rider's operation. Information on the rider's operation using the input device 15 is output to the controller 20.

The front-wheel rotational frequency sensor 16 is a wheel rotational frequency sensor that detects a rotational frequency of the front wheel (for example, a rotational frequency of the front wheel per unit time [rpm], a travel distance of the front wheel per unit time [km/h], or the like), and outputs a detection result. The front-wheel rotational frequency sensor 16 may detect another physical quantity that can substantially be converted to the rotational frequency of the front wheel. The front-wheel rotational frequency sensor 16 is provided to the front wheel.

The rear-wheel rotational frequency sensor 17 is a wheel rotational frequency sensor that detects a rotational frequency of the rear wheel (for example, the rotational frequency of the rear wheel per unit time [rpm], a travel distance of the rear wheel per unit time [km/h], or the like), and outputs a detection result. The rear-wheel rotational frequency sensor 17 may detect another physical quantity that can substantially be converted to the rotational frequency of the rear wheel. The rear-wheel rotational frequency sensor 17 is provided to the rear wheel.

The controller 20 controls behavior of the motorcycle 1. For example, the controller 20 is partially or entirely constructed of a microcomputer, a microprocessor unit, or the like. Alternatively, the controller 20 may partially or entirely be constructed of one whose firmware and the like can be updated, or may partially or entirely be a program module or the like that is executed by a command from a CPU or the like, for example. The controller 20 may be provided as one unit or may be divided into multiple units, for example.

FIG. 2 is a block diagram illustrating an exemplary functional configuration of the controller 20. As illustrated in FIG. 2, the controller 20 includes an acquisition section 21, an execution section 22, and an identification section 23, for example. In addition, the controller 20 communicates with each device in the motorcycle 1.

The acquisition section 21 acquires information from each of the devices in the motorcycle 1, and outputs the acquired information to the execution section 22 and the identification section 23. For example, the acquisition section 21 acquires information from the surrounding environment sensor 14, the input device 15, the front-wheel rotational frequency sensor 16, and the rear-wheel rotational frequency sensor 17. In the present specification, the acquisition of the information can include extraction, generation, and the like of the information.

The execution section 22 executes various types of control by controlling operation of each of the devices in the motorcycle 1. For example, the execution section 22 controls the operation of the engine 11, the hydraulic pressure control unit 12, and the display device 13.

Here, the execution section 22 can execute adaptive cruise control. In the adaptive cruise control, the execution section 22 automatically controls the speed of the motorcycle 1 regardless of accelerating/decelerating operation (that is, an accelerator operation and a brake operation) by the rider. The execution section 22 monitors the speed value of the motorcycle 1 that is acquired based on the rotational frequency of the front wheel and the rotational frequency of the rear wheel, and can thereby control the speed of the motorcycle 1 to a speed that does not exceed a preset upper-limit speed, for example.

In addition, in the adaptive cruise control, the execution section 22 executes distance maintenance control to maintain a distance between the motorcycle 1 and a target vehicle to a target distance. The distance may be referred to as an inter-vehicular distance in the present disclosure. The execution section 22 executes the distance maintenance control based on the surrounding environment information that is detected by the surrounding environment sensor 14. The surrounding environment sensor 14 can detect the distance between the motorcycle 1 and a preceding vehicle that travels ahead of the motorcycle 1, and can detect a relative speed of the motorcycle 1 to the preceding vehicle. For example, in the distance maintenance control, the execution section 22 sets the preceding vehicle as the target vehicle and controls the speed of the motorcycle 1 so as to maintain the distance from the preceding vehicle to the target distance. Here, the distance may mean a distance in a direction along a lane (more specifically, a travel lane of the motorcycle 1) or may mean a straight-line distance.

The execution section 22 executes the adaptive cruise control according to the rider's operation using the input device 15, for example. Here, in regard to the motorcycle 1, the rider can select a group riding mode as a mode of the adaptive cruise control. When the group riding mode is selected, the execution section 22 executes the group riding mode as the adaptive cruise control. In the adaptive cruise control, the group riding mode is a mode that is particularly suited for group riding. For example, in the group riding mode, a short distance is set as the target distance in the distance maintenance control.

The identification section 23 identifies a first convoy in which the ego vehicle 1 in the group riding is located (hereinafter also referred to as a convoy of the ego vehicle 1 or an ego convoy). The identification section 23 outputs information on the identified ego convoy to the execution section 22. In the group riding, a plurality of motorcycles travel in a group forming at least the first convoy and a second convoy separated from each other. A description will hereinafter be made on an overview of the group riding with reference to FIG. 3.

FIG. 3 is a view illustrating the group riding situation where the motorcycle 1 (i.e., the evo vehicle 1) is traveling in a group. The vehicles 2 are included in the group and is other than the ego vehicle 1. FIG. 3 shows the ego vehicle 1 and vehicles 2a, 2b, 2c, 2d included in the vehicles 2.

As illustrated in FIG. 3, in the group riding, the motorcycles travel in two convoys of a left convoy and a right convoy in the same lane. In an example illustrated in FIG. 3, the vehicle 2b and the vehicle 2c constitute the left convoy. The vehicle 2b and the vehicle 2c are aligned in this order from the front. Meanwhile, the vehicle 2a, the ego vehicle 1, and the vehicle 2d constitute the right convoy. The vehicle 2a, the ego vehicle 1, and the vehicle 2d are aligned in this order from the front in a front-rear direction.

In addition, as illustrated in FIG. 3, in the group riding, the motorcycles in the left convoy and the motorcycles in the right convoy are alternately arranged in the front-rear direction. In other words, the motorcycles in the left convoy and the motorcycles in the right convoy are located in zigzag arrangement. As an example illustrated in FIG. 3, the vehicle 2a in the right convoy, the vehicle 2b in the left convoy, the ego vehicle 1 in the right convoy, the vehicle 2c in the left convoy, and the vehicle 2d in the right convoy are arranged in this order from the front.

As described above, in the group riding, the motorcycles travel in the zigzag arrangement. Accordingly, as compared to a case where the motorcycles travel by forming a single convoy, a distance between two adjacent motorcycles in the front-rear direction can be shortened. As a result, the group can be prevented from being divided due to a traffic light.

In this embodiment, as described above, the identification section 23 identifies the first convoy (i.e., the ego convoy) including the ego vehicle 1 in the group riding. Then, the execution section 22 executes the adaptive cruise control based on a first travel state information that is information about a travel state of the second vehicles (e.g., the vehicles 2b, 2c shown in FIG. 3). The second vehicle is one of the vehicles 2 and in the second convoy that is separated from the first convoy including the ego vehicle 1. In this way, the adaptive cruise control is appropriately executed for the motorcycle 1 in the group riding. Here, the travel state information can include various types of information on a vehicle travel state (for example, a position, a speed, acceleration, and the like of the vehicle). Such control processes executed by the controller 20 for the group riding will be described later in greater detail.

<Operation of Controller>

With reference to FIG. 4 to FIG. 7, operations of the controller 20 according to the present disclosure will be described hereafter.

FIG. 4 is a flowchart illustrating an example of a control flow that is related to the group riding and is executed by the controller 20. For example, a control flow illustrated in FIG. 4 is repeatedly executed at a specified time interval which is set in advance. At S101, the control flow illustrated in FIG. 4 starts. At S106, the control flow illustrated in FIG. 4 ends.

When the control flow illustrated in FIG. 4 starts, the control flow advances to S102. At S102, the controller 20 determines whether the group riding mode is currently executed. When it is determined that the group riding mode is currently executed (YES at S102), the control flow advances to S103. On the other hand, when it is determined that the group riding mode is not currently executed (NO at S102), the control flow illustrated in FIG. 4 ends.

When it is determined YES at S102, the control flow advances to S103 so that the identification section 23 of the controller 20 executes identification to identify the first convoy (i.e., the ego convoy) including the ego vehicle 1.

During an identification process in which the ego convoy is identified, the identification section 23 identifies the ego convoy based on status information. For example, the status information may be information about a status that is input by the rider in a status setting operation. For example, the status setting operation is performed by using the input device 15 to set the ego convoy in the controller 20. For example, an input screen for accepting the status setting operation may be displayed on the display device 13, and then the rider may perform the status setting operation by using the input screen. In the case where the status information indicates that the ego convoy is the right convoy, the identification section 23 identifies that the ego convoy is the right convoy. On the other hand, in the case where the status information indicates that the ego convoy is the left convoy, the identification section 23 identifies that the ego convoy is the left convoy. For example, as an example illustrated in FIG. 3, the identification section 23 identifies that the ego convoy is the right convoy.

However, the identification section 23 may identify the ego convoy without using the status information. For example, the identification section 23 may identify the ego convoy in response to detection results output from the surrounding environment sensor 14. In this case, for example, the identification section 23 identifies one of the vehicles 2 in the group which is traveling ahead of the ego vehicle 1 and which is the closest to the ego vehicle 1 in the front-rear direction. Then, the identification section 23 can identify the ego convoy based on a positional relationship between the identified vehicle 2 and the ego vehicle 1. For example, in the case where the identified vehicle 2 is located on a left side of the ego vehicle 1, the identification section 23 identifies that the ego convoy is the right convoy.

The control flow advances to S104 after S103. At S104, the controller 20 determines whether the ego convoy is identified. When it is determined that the ego convoy is identified (YES at S104), the control flow advances to S105. On the other hand, when it is determined that the ego convoy is not identified (NO at S104), the control flow illustrated in FIG. 4 ends.

When it is determined YES at S104, the control flow advances to S105. At S105, the execution section 22 of the controller 20 executes the adaptive cruise control and the control flow shown in FIG. 4 ends. Specifically, at S105, the execution section 22 executes the adaptive cruise control based on the travel state information of the second vehicle that is one of the vehicles 2 and that is in the second convoy (i.e., the other convoy) other than the ego convoy. For example, the second vehicle is the vehicle 2b and/or the vehicle 2c in FIG. 3.

According to the present embodiment, the identification section 23 identifies the ego convoy. Thus, the controller 20 can determine whether the second convoy is located on the left side of the ego vehicle 1 or is located on the right side of the ego vehicle 1. As a result, the acquisition section 21 can acquire the travel state information of the second vehicle, which is one of the vehicles 2 in the second convoy, for example, in response to the detection result output from the surrounding environment sensor. Thus, the execution section 22 can execute the adaptive cruise control based on the travel state information of the second vehicle.

The adaptive cruise control may be required to be performed more appropriately based on traffic conditions. As such, it is preferred that the execution section 22 executes the adaptive cruise control based on the travel state information of the second vehicle and a travel state information of a third vehicle that is one of the vehicles 2 and that is in the ego convoy (i.e., the first convoy). The travel state information of the second vehicle may be referred to as a first travel state information in the present disclosure. The travel state information of the third vehicle may be referred to as a second travel state information in the present disclosure. Hereafter, an example in which the execution section 22 executes the adaptive cruise control based on the second travel state information of the vehicle 2b (i.e., the second vehicle) and the third travel state information of the vehicle 2a (i.e., the third vehicle) will be described.

For example, the execution section 22 sets the third vehicle as the target vehicle for the distance maintenance control and, under a particular situation, switches the target vehicle from the third vehicle to the second vehicle. With reference to FIG. 5 and FIG. 6, a description will hereinafter be made on an example of a situation where the target vehicle is switched.

FIG. 5 is a view illustrating a situation where the group including the motorcycle 1 (i.e., the ego vehicle 1) travels straight. According to the example illustrated in FIG. 5, the ego vehicle 1 and the vehicles 2a, 2b, 2c, 2d travel along a straight road in the same arrangement as that in FIG. 3. The straight road is defined as a travel road having a curvature radius that is large enough not to affect the rider of the motorcycle 1 in driving the motorcycle 1. The ego convoy is the right convoy, and the other convoy is the left convoy. The vehicles 2a, 2d correspond to the third vehicles, and the vehicles 2b, 2c correspond to the second vehicles.

The execution section 22 basically sets the target vehicle for the distance maintenance control by selecting one from the vehicles 2 that is located ahead of the ego vehicle 1 and is located closest to the ego vehicle 1 in the ego convoy. According to the example illustrated in FIG. 5, the target vehicle is the vehicle 2a. In this case, a distance between the ego vehicle 1 and the vehicle 2a is maintained to the target distance.

Here, in a state where the distance between the ego vehicle 1 and the second vehicle falls below a lower limit value (i.e., when the distance between the ego vehicle 1 and the second vehicle falls below the lower limit value), the execution section 22 sets the second vehicle as the target vehicle for the distance maintenance control. According to the example shown in FIG. 5, the vehicle 2b is located in front of the ego vehicle 1 and is located closest to the ego vehicle 1 in the second convoy. The execution section 22 switches that target vehicle from the vehicle 2a to the vehicle 2b when a distance D1 between the ego vehicle 1 and the vehicle 2b falls below the lower limit value. The lower limit value is set to a value with which it is determined that the ego vehicle 1 approaches the vehicle 2b and possibly overtakes the vehicle 2b.

Once the vehicle 2b is set as the target vehicle, the distance between the ego vehicle 1 and the vehicle 2b is maintained to the target distance. More specifically, in the distance maintenance control, the execution section 22 controls the speed of the ego vehicle 1 based on the distance between the ego vehicle 1 and the vehicle 2b and the relative speed of the ego vehicle 1 to the vehicle 2b. As a result, the ego vehicle 1 is prevented from overtaking the vehicle 2b. Thus, the condition in which the group including the ego vehicle 1 travels in the zigzag arrangement is maintained.

FIG. 6 is a view illustrating a situation where the group including the motorcycle 1 (i.e., the ego vehicle 1) turns a curve. According to the example illustrated in FIG. 6, the ego vehicle 1 and the vehicles 2a, 2b, 2c, 2d travel along a curved road in the same arrangement as that in FIG. 3. Here, the curved road is a travel road having a curvature radius that is small and affects the rider of the motorcycle 1 in driving the motorcycle 1. The ego convoy is the right convoy, and the other convoy is the left convoy. The vehicles 2a, 2d correspond to the third vehicles, and the vehicles 2b, 2c correspond to the second vehicles.

In a state where the group including the ego vehicle 1 turns the curve (i.e., when the group including the ego vehicle 1 turns the curve), the execution section 22 sets the second vehicle as the target vehicle for the distance maintenance control. For example, the group traveling straight while the vehicle 2a is set as the target vehicle may start turning the curve as shown in FIG. 6. In this case, the execution section 22 sets, as the target vehicle, the vehicle 2b that is located in front of the ego vehicle 1 and is located closest to the ego vehicle 1 in the second convoy. That is, the execution section 22 switches the target vehicle from the vehicle 2a to the vehicle 2b.

For example, the execution section 22 determines whether the ego vehicle 1 is currently turning the curve. When the execution section 22 determines that the ego vehicle 1 is currently turning the curve, the execution section 22 can determine that the group including the ego vehicle 1 is currently turning the curve. For example, the execution section 22 may determine whether the ego vehicle 1 is currently turning the curve based on information obtained by using an inertial measurement unit (IMU) or a car navigation system.

When the group including the ego vehicle 1 turns the curve, the distance between adjacent vehicles in the front-rear direction tends to be longer as compared to a case where the group travels straight for a purpose of improving safety. As such, according to the example illustrated in FIG. 6, the vehicle 2a may be away from the ego vehicle 1 and go outside of a detection range of the surrounding environment sensor 14. Therefore, the execution section 22 switches the target vehicle to the vehicle 2b to have the target vehicle in the detection range certainly.

Here, it may be required to improve safety of the vehicles when the group of the vehicles turns a curve. As such, it is preferable to increase the target distance for the distance maintenance control when the group turns a curve as compared to the target distance when the group travels straight. To secure safety, the distance between the adjacent vehicles in the traveling direction when the group including the ego vehicle 1 turns a curve is required to be longer than the distance between the adjacent vehicles in the traveling direction when the group travels straight. Therefore, the safety can be improved by changing the target distance in the distance maintenance control as described above according to whether the group is currently turns the curve.

The above description has been made on the example in which the adaptive cruise control is executed based on the first travel state information of the vehicle 2b (i.e., the second vehicle) and the second travel state information of the vehicle 2a (i.e., the third vehicle). However, the execution section 22 may execute the adaptive cruise control based on only the first travel state information of the second vehicle without using the second travel state information of the third vehicle.

For example, the execution section 22 may execute the adaptive cruise control based on only the travel state information of the vehicle 2b without using the travel state information of the vehicle 2a. In this case, the execution section 22 may set the vehicle 2b as the target vehicle for the distance maintenance control. More specifically, regardless of a situation, e.g., whether the group travels the curve, the execution section 22 may set the vehicle 2b as the target vehicle for the distance maintenance control. In this case, in the distance maintenance control, the execution section 22 controls the speed of the ego vehicle 1 based on the distance between the ego vehicle 1 and the vehicle 2b and the relative speed of the ego vehicle 1 to the vehicle 2b regardless of the situation. Also in this case, in the state where the group including the ego vehicle 1 travels the curve, the execution section 22 may set the target distance in the distance maintenance control to be longer than that in the state where the group ridings straight.

The above description has been made on the example in which the adaptive cruise control is executed based on the travel state information of the vehicle 2b as the second vehicle that is located ahead of the ego vehicle 1. However, the execution section 22 may execute the adaptive cruise control based on the travel state information of the second vehicle (e.g., the vehicle 2c) that is located behind the ego vehicle 1.

For example, when the distance between the ego vehicle 1 and the vehicle 2c falls below the lower limit value while the vehicle 2a is set as the target vehicle, the execution section 22 may switch the target vehicle from the vehicle 2a to the vehicle 2c. In addition, for example, when the group including the ego vehicle 1 turns the curve, the execution section 22 may set the vehicle 2c, which is the second vehicle and is located behind the ego vehicle 1, as the target vehicle for the distance maintenance control. Furthermore, the execution section 22 may set the vehicle 2c as the target vehicle for the distance maintenance control regardless of the situation.

An example of the control process that is related to the group riding and is executed by the controller 20 is described above with reference to the flowchart in FIG. 4. However, the controller 20 may execute another control process related to the group riding.

For example, a detection area is defined as an area in which the surrounding environment information used in the adaptive cruise control is obtained. The execution section 22 may change the detection area in response to the identification result output from the identification section 23 that identifies the ego convoy. As described above, the distance maintenance control in the adaptive cruise control is executed based on the surrounding environment information that is detected by the surrounding environment sensor 14. The execution section 22 changes the detection area of the surrounding environment sensor 14 in response to the identification result from the identification section 23.

FIG. 7 is a view illustrating a situation where the detection area of the surrounding environment information is changed. The surrounding environment information is used for the adaptive cruise control executed by the motorcycle 1. In FIG. 7, a detection range 18 of the surrounding environment sensor 14 before changing the detection area is indicated by broken lines, and the detection range 18 after changing the detection area is indicated by solid lines.

As illustrated in FIG. 7, the detection range 18 of the surrounding environment sensor 14 expands radially from a front portion of the motorcycle 1 toward the front side. The surrounding environment sensor 14 can detect the surrounding environment information within the detection range 18. That is, the detection area in which the surrounding environment information is detected by the surrounding environment sensor 14 basically matches the detection range 18 of the surrounding environment sensor 14. However, as will be described below, the detection area in which the surrounding environment information is obtained by the surrounding environment sensor 14 can be changed without changing the detection range 18 of the surrounding environment sensor 14. Thus, the detection area and the detection range 18 will be described separately.

The execution section 22 changes the detection range 18 by the surrounding environment sensor 14 and thereby changes the detection area of the surrounding environment information detected by the surrounding environment sensor 14. Specifically, the execution section 22 places a center C1 of the detection range 18 of the surrounding environment sensor 14 on a side where the second vehicle exists with a travel trajectory of the ego vehicle 1 being a reference. In other words, the execution section 22 places the center C1 of the detection range 18 between the travel trajectory of the ego vehicle 1 and the second vehicle in the second convoy. As a result, a center of the detection area in which the surrounding environment information obtained by the surrounding environment sensor 14 is located between the travel trajectory of the ego vehicle 1 and the second vehicle. The center C1 of the detection range 18 is located on the travel trajectory of the ego vehicle as shown in the broken line before changing the detection range 18. For example, the center C1 may be defined as a center axis of a range expanding radially.

In the example illustrated in FIG. 7, the ego convoy identified by the identification section 23 is the right convoy. Accordingly, in this case, as indicated by a solid line, the execution section 22 places the center C1 of the detection range 18 by the surrounding environment sensor 14 on the left side with respect to the travel trajectory of the ego vehicle 1 (i.e., on the side where the vehicles 2b, 2c as the second vehicles exist). As a result, the center of the detection area of the surrounding environment information detected by the surrounding environment sensor 14 is located on the left side with respect to the travel trajectory of the ego vehicle 1. In this way, as indicated by the solid lines in FIG. 7, the detection range 18 of the surrounding environment sensor 14 (i.e., the detection area of the surrounding environment information detected by the surrounding environment sensor 14) can be placed within the travel lane of the ego vehicle 1. Here, when another vehicle is located in an adjacent lane next to the travel lane in which the ego vehicle 1 is located, the other vehicle may come into the detection range 18 if the detection range 18 is not changed. According to the present disclosure, the detection range 18 is changed to be within the travel lane of the ego vehicle 1. Therefore, the other vehicle in the adjacent lane can be prevented from being identified as the target vehicle in the distance maintenance control.

The execution section 22 may change the detection area of the surrounding environment information detected by the surrounding environment sensor 14 without changing the detection range 18 of the surrounding environment sensor 14. For example, the execution section 22 may change the detection area of the surrounding environment information in a manner that the surrounding environment information is not obtained within a specified area inside the detection range 18. As an example shown in FIG. 7, the surrounding environment information is not obtained on a right side of the travel trajectory of the ego vehicle 1.

In the flowchart shown in FIG. 4, the control process of S103 and the following control processes thereafter are performed when it is determined that the group riding mode is currently executed (YES at S102). However, an execution condition of the control processes at S103 and thereafter is not limited to the above-described example. The above-described execution condition only needs to be a condition with which it is possible to determine that the group including the ego vehicle 1 and the vehicles 2 makes the group riding. For example, the above-described execution condition may be a condition where it is determined that the ego vehicle 1 and the vehicles 2 travel in the zigzag arrangement. For example, the controller 20 acquires the information on the positional relationships between the ego vehicle 1 and the vehicles 2 via wireless communication with the vehicles 2 or infrastructure equipment, and can thereby determine whether the ego vehicle 1 and the vehicles 2 travel in the zigzag arrangement by using such information.

<Effects of Controller>

A description will be made on effects of the controller 20 according to the embodiment of the present disclosure.

In the controller 20, the identification section 23 identifies the first convoy (i.e., the ego convoy) in which the ego vehicle 1 in the group riding is located. In the group riding, the group of the motorcycles travel by forming at least two convoys (i.e., the first convoy and the second convoy) separated from each other. Then, the execution section 22 executes the adaptive cruise control based on the first travel state information of the second vehicles (e.g., the vehicles 2b, 2c) that are included in the vehicles 2 and that are in the second convoy (i.e., the other convoy). In this way, in the group riding, the adaptive cruise control can be executed according to the traffic condition around the ego vehicle 1. Therefore, it is possible to appropriately execute the adaptive cruise control of the motorcycle 1 in the group riding.

Preferably, in the controller 20, the execution section 22 executes the adaptive cruise control based on, in addition to the first travel state information of the second vehicles, the second travel state information of the third vehicles (e.g., the vehicles 2a, 2d) that are included in the vehicles 2 and are located in the first convoy (i.e., the ego convoy) in which the ego vehicle 1 is located. In this way, it is possible to execute the adaptive cruise control by using larger pieces of the information about the traffic condition around the ego vehicle 1. Therefore, it is possible to execute the adaptive cruise control of the motorcycle 1 in the group riding more appropriately.

Preferably, in the controller 20, the execution section 22 sets the third vehicle (e.g., the vehicle 2a) as the target vehicle for the distance maintenance control. In this way, it is possible to maintain the distance between the ego vehicle 1 and the vehicle 2, which travels along the travel trajectory of the ego vehicle 1, to the target distance. Therefore, it is possible to suppress a cause of a collision with the vehicle 2 in the group and assist the rider in driving the ego vehicle 1.

Preferably, in the controller 20, when the distance between the ego vehicle 1 and the second vehicle (e.g., the vehicle 2b) falls below the lower limit value, the execution section 22 sets the second vehicle as the target vehicle for the distance maintenance control. In this way, when the ego vehicle 1 approaches the second vehicle and possibly overtakes the second vehicle, the second vehicle can be set as the target vehicle. As a result, the ego vehicle 1 is suppressed from overtaking the second vehicle. Thus, the state where the group including the ego vehicle 1 travels in the zigzag arrangement can be maintained.

Preferably, in the controller 20, when the group of the motorcycles including the ego vehicle 1 turns the curve, the execution section 22 sets the second vehicle (e.g., the vehicle 2b) as the target vehicle for the distance maintenance control. Here, in a case where the third vehicle is kept to be set as the target vehicle, the third vehicle as the target vehicle may go away from the ego vehicle and go outside of the detection range when the group of the motorcycles turn a curve. Accordingly, when the group of the motorcycles turns the curve, the second vehicle is set as the target vehicle for the distance maintenance control. As a result, the target vehicle can be prevented from being no longer detected.

Preferably, in the controller 20, the execution section 22 sets the second vehicle (i.e., the vehicle 2b) as the target vehicle for the distance maintenance control. In this way, it is possible to maintain the distance between the ego vehicle 1 and the second vehicle to the target distance. As a result, the ego vehicle 1 is effectively prevented from overtaking the second vehicle. Thus, the group of motorcycles including the ego vehicle 1 can travel in the zigzag arrangement easily and certainly.

Preferably, in the controller 20, when the group of motorcycles including the ego vehicle 1 turn the curve, the execution section 22 sets the target distance in the distance maintenance control to be longer than that in the state where the group of motorcycles travel straight. As a result, the distance between the ego vehicle 1 and the target vehicle is increased, and the safety while the group of motorcycles turn a curve can be improved.

Preferably, in the controller 20, the execution section 22 changes the detection area of the surrounding environment information, which is information used for the adaptive cruise control, in response to the identification result output from the identification section 23 that identifies the first convoy (i.e., the ego convoy) of the ego vehicle 1. As a result, it is possible to prevent the other vehicle, which is not in the group of motorcycles and is in the adjacent lane adjacent to the travel lane of the ego vehicle 1, from being identified as the target vehicle in the distance maintenance control mistakenly. Therefore, it is possible to execute the adaptive cruise control more appropriately.

Preferably, in the controller 20, the execution section 22 places the center of the detection area of the surrounding environment information between the travel trajectory of the ego vehicle 1 and the second vehicles (e.g., the vehicles 2b, 2c). In this way, the detection area of the surrounding environment information used for the adaptive cruise control can be placed within the travel lane of the ego vehicle 1. As a result, it is possible to prevent the other vehicle, which is not in the group of motorcycles and is in the adjacent lane adjacent to the travel lane of the ego vehicle 1, from being identified as the target vehicle in the distance maintenance control mistakenly.

Preferably, in the controller 20, the second vehicle described above is the vehicle (e.g., the vehicle 2c) that is located behind the ego vehicle 1. That is, preferably, the execution section 22 executes the adaptive cruise control based on the travel state information about the second vehicle (e.g., the vehicle 2c) that is located behind the ego vehicle 1. As a result, in the group riding, it is possible to appropriately execute the adaptive cruise control according to the traffic condition behind the ego vehicle 1.

The present disclosure is not limited to the embodiment that has been described. For example, only a part of the embodiment may be implemented.

REFERENCE SIGNS LIST

1: Motorcycle (ego vehicle)
2: Motorcycle (vehicle)
2a: Vehicle
2b: Vehicle
2c: Vehicle
2d: Vehicle
11: Engine
12: Hydraulic pressure control unit
13: Display device
14: Surrounding environment sensor
15: Input device
16: Front-wheel rotational frequency sensor
17: Rear-wheel rotational frequency sensor
18: Detection range
20: Controller
21: Acquisition section
22: Execution section
23: Identification section
C1: Center
D1: distance

The invention claimed is:

1. A controller (20) configured to maneuver a motorcycle (1), the controller configured to:
   execute an adaptive cruise control based on a surrounding environment information that is information about a surrounding environment of the motorcycle (1), the adaptive cruise control including
   controlling a speed of the motorcycle (1) automatically without an accelerating/decelerating operation by a rider of the motorcycle (1), and
   executing a distance maintenance control to keep a distance between the motorcycle (1) and a target vehicle at a target distance; and
   identify, based on status information or detection results output from a surrounding environment sensor (14), that a first convoy, including the motorcycle (1) in a group riding in which the motorcycle (1) travels in a group of a plurality of motorcycles (2) forming at least the first convoy and a second convoy separated from each other, is a right convoy or a left convoy, wherein
   the controller (20) is configured to execute the adaptive cruise control based on a first travel state information about a travel state of a second motorcycle, wherein the second motorcycle is one of the plurality of motorcycles (2) and is in the second convoy, wherein both the first convoy and the second convoy are in the same lane, and
   the controller (20) is configured to change a detection range in which the surrounding environment information used in the adaptive cruise control in response to identifying the first convoy including the motorcycle (1), the detection range is changed by setting a center of the detection range to be located between a travel trajectory of the motorcycle (1) and the second motorcycle.

2. The controller according to claim 1, wherein the controller (20)
   is configured to execute the adaptive cruise control based on the first travel state information and a second travel state information about a travel state of a third motorcycle, the third motorcycle is one of the plurality of motorcycles (2) and is in the first convoy.

3. The controller according to claim 2, wherein the controller (20) is configured to set the third motorcycle as the target vehicle in the distance maintenance control.

4. The controller according to claim 3, wherein the controller (20) is configured to set the second motorcycle as the target vehicle in the distance maintenance control while a distance between the motorcycle (1) and the second motorcycle is shorter than a lower limit value.

5. The controller according to claim 3, wherein the controller (20) is configured to set the second motorcycle as the target vehicle in the distance maintenance control while the plurality of motorcycles is turning a curve.

6. The controller according to claim 5, wherein the controller (20), in the distance maintenance control, is configured to set the target distance so that the target distance in a case where the plurality of motorcycles is turning the curve becomes longer than the target distance in a case where the plurality of motorcycles travels straight.

7. The controller according to claim 1, wherein the controller (20) is configured to set the second motorcycle as the target vehicle in the distance maintenance control.

8. The controller according to claim 1, wherein the second motorcycle is located behind the motorcycle (1).

9. The controller according to claim 1, wherein the detection range is within the same lane of the motorcycle (1).

10. A control method for maneuvering a motorcycle (1), the control method comprising:

executing, by a controller (20), an adaptive cruise control based on a surrounding environment information that is information about a surrounding environment of the motorcycle (1), wherein the controller (20), in the adaptive cruise control, is configured to:

control a speed of the motorcycle (1) automatically without an accelerating/decelerating operation by a rider of the motorcycle (1); and execute a distance maintenance control to keep a distance between the motorcycle (1) and a target vehicle at a target distance;

identifying based on status information or detection results output from a surrounding environment sensor (14), by the controller (20), that a first convoy, including the motorcycle (1) in a group riding in which the motorcycle (1) travels in a group of a plurality of motorcycles (2) forming at least the first convoy and a second convoy separated from each other, is a right convoy or a left convoy, and executing, by the controller (20), the adaptive cruise control based on a travel state information about a travel state of a second motorcycle, wherein the second motorcycle is one of the plurality of motorcycles (2) and is in the second convoy, wherein both the first convoy and the second convoy are in the same lane, and changing, by the controller (20), a detection range in which the surrounding environment information used in the adaptive cruise control in response to identifying the first convoy including the motorcycle (1), the detection range is changed by setting a center of the detection range to be located between a travel trajectory of the motorcycle (1) and the second motorcycle.

\* \* \* \* \*